United States Patent [19]
Taylor

[11] Patent Number: 6,139,753
[45] Date of Patent: Oct. 31, 2000

[54] METHOD FOR TREATING ACIDIC WASTE WATER

[75] Inventor: Reginald Morton Taylor, Hawthorn, Australia

[73] Assignee: GEO2 Limited, Melbourne, Australia

[21] Appl. No.: 09/155,490

[22] PCT Filed: Mar. 21, 1997

[86] PCT No.: PCT/AU97/00179

§ 371 Date: Mar. 25, 1999

§ 102(e) Date: Mar. 25, 1999

[87] PCT Pub. No.: WO97/36829

PCT Pub. Date: Oct. 9, 1997

[30] Foreign Application Priority Data

Mar. 21, 1997 [AU] Australia ................. PN8955

[51] Int. Cl.$^7$ ....................................... C02F 1/64
[52] U.S. Cl. ................. 210/717; 210/724; 210/738; 210/912; 423/140; 423/142; 423/594
[58] Field of Search ..................... 210/702, 716, 210/717, 723, 724, 726, 912, 913, 738; 423/140, 142, 594

[56] References Cited

U.S. PATENT DOCUMENTS

| | | | |
|---|---|---|---|
| 2,350,095 | 5/1944 | Carlson et al. | 210/738 |
| 3,511,777 | 5/1970 | Spinola | 210/738 |
| 3,575,853 | 4/1971 | Gaughan et al. | 210/713 |
| 4,169,053 | 9/1979 | Sakakibara et al. | 210/738 |
| 4,321,149 | 3/1982 | Hawxhurst et al. | 210/720 |
| 4,543,189 | 9/1985 | Rice et al. | 210/912 |
| 4,680,126 | 7/1987 | Frankard et al. | 210/912 |
| 4,749,497 | 6/1988 | Kanzleiter et al. | 210/721 |
| 5,169,538 | 12/1992 | Habermann et al. | 210/709 |
| 5,308,501 | 5/1994 | Eckert | 210/718 |
| 5,427,691 | 6/1995 | Kuyucak et al. | 210/713 |
| 5,672,280 | 9/1997 | Demopoulos et al. | 210/709 |
| 5,698,107 | 12/1997 | Wurzburger et al. | 210/912 |

FOREIGN PATENT DOCUMENTS

| | | |
|---|---|---|
| WO 83/02446 | 7/1983 | WIPO . |
| WO 94/18126 | 8/1994 | WIPO . |

OTHER PUBLICATIONS

Derwent Abstracts Accession No. 89–127593/17, class D15; JP 1–075093 A (Mitsubishi Metal KK), Mar. 20, 1989.
Derwent Abstracts Accession No. 86–025531/04, class D15, JP 60–248293 A (Tamanoi), Dec. 7, 1985.
Derwent Abstracts Accession No. 86–016480/03, class D15, JP 60–238194 A (Morimoto), Nov. 27, 1985.
Derwent Abstracts Accession No. 85–161543/27, class D15, JP 60–090832 (Shin–Nippon Kinzoku), May 22, 1985.
Derwent Abstracts Accession No. 71300W/43, class D15, JP 50–024160 A (Hitachi KK), Mar. 15, 1975.
Japio Online Abstract 84–010391, class 13.1, JP 59–010391 A (Morimoto), Jan. 19, 1984.
Japio Online Abstract 80–061996, class 13.1 JP 55–061996 A (Mitsubishi Heavy Ind Ltd) May 10, 1980.

*Primary Examiner*—Peter A. Hruskoci
*Attorney, Agent, or Firm*—Wolf, Greenfield & Sacks, P.C.

[57] ABSTRACT

The present invention relates to a method of treatment of acid waste waters or acid drainage waters containing metals comprising ferrous and ferric ions, the method comprising increasing the pH of the acid waste to at least 7.5 by addition of an alkaline reagent under conditions such that ferrous ions are stable with respect to oxidation to ferric ions, to form a precipitate and collecting the precipitate.

15 Claims, No Drawings

METHOD FOR TREATING ACIDIC WASTE WATER

BACKGROUND OF THE INVENTION

This invention relates to precipitation processes for the remediation of acidic waste and drainage waters comprising metal and/or metalloid ions such as ions selected from (but not restricted to) the group consisting of copper, zinc, lead, mercury, cadmium, iron, arsenic, barium, selenium, silver, chromium, aluminium, manganese, nickel, cobalt, uranium and antimony.

In particular the invention relates to the remediation of acidic waste water comprising iron ions and sulfate ions, as well as other undesirable metal or metalloid species. Such waters are frequently formed as a result of the oxidation and leaching of sulfide minerals during and after mining operations, and are referred to as acid mine drainage.

Significant quantities of acid mine drainage are associated with many former and current mining operations such as the Berkeley Pit in Butte, Mont. USA. The problems caused by acid mine drainage include:

- toxicity arising from particular metal contaminants e.g. cadmium, arsenic
- environmental pollution where the waters containing such metals are allowed to flow to areas producing contamination with toxic elements being labile or only loosely bound by adsorption
- the corrosive effects arising from the acidic pH values from sulfide oxidation to sulfuric acid
- the foregone opportunity of using the water values for irrigation or human purposes and
- the foregone opportunity of recovering useful metals contained in the contaminated water, e.g. copper and zinc. Approximately 8000 lbs (3600 Kilograms) of copper and 20,000 lbs (9000 Kilograms) zinc enter the Berkeley Pit each day.

A wide variety of methods have been proposed for the remediation of acid waste drainage.

In-situ mitigation is a method whereby limestone placements are put down to collect surface run-off and funnel it into waste rock dumps. Such a method is described in SITE 94, p. 374, presented by the University of South Carolina. [The publication SITE 94 refers to the U.S. EPA Superfund Innovative Technology Evaluation Program, Technology Profiles, Seventh Edition 1994. This document is issued by the Risk Reduction Engineering Laboratory Office of Research and Development, U.S. EPA Cincinnati, Ohio, 45268, USA.] Acidic material is capped with an impermeable layer to divert water from the acid cores. This method relies on the existence of sufficient rainfall to produce seepage or drainage that continually contacts the limestone. The method has limited efficiency for remediation (as judged by the acidity of treated versus untreated areas) and is weather dependent.

Wet-lands based treatment has also been considered. This method uses a man-made wet-land ecosystem to remove heavy metals and is described in SITE 94, p. 164 (Colorado Department of Public Health and Environment). This method is not able to recover useful metals from the acid mine drainage and removal efficiencies are generally less than for chemical precipitation processes.

Another method described in SITE 94, p. 56 (Dynaphore Inc.) involves adsorption followed by pumping or drainage through an open-celled cellulose sponge containing amine-functional polymers with selective affinity for aqueous heavy metals in both cationic and anionic form. This method (in common with other methods based on absorbent or adsorbent material) has limited efficiency for the removal of some metal ions from a complex mixture and for anions such as sulfate. It is characterised by high capital costs and by the generation of relatively dilute strip liquor.

SITE 94 at p. 304 describes a method involving precipitation plus adsorption in which the pH of the waste stream is adjusted to 9–10 (under standard atmospheric conditions) followed by pumping/drainage through a column containing adsorbent ferrihydrite applied to the surface of an inert substrate such as sand. This method has limited efficiency for the removal of sulfate anions and generates relatively dilute strip liquor. For waste streams containing relatively high levels of ferrous ions such as acid mine drainage from the Berkeley Pit, the adjustment under oxidising atmospheric conditions to pH up to 9–10 will involve the precipitation of large quantities of amorphous or poorly crystalline ferrihydrite having particle size and surface characteristics which lead to high sludge volumes and consequently to facile blocking of separation columns.

Methods of simple precipitation by raising the pH to 9–11 using hydroxide anions under standard atmospheric conditions have been described. These methods lead to ferrihydrite formation and its attendant problem of high sludge volumes as described above. The requirement to go to pH 11 for some metals followed by neutralisation also adds significant costs and sulfate anions are not removed by this process. This method is described in Principles of Aquatic Chemistry, F. M. M. Morel, WileyInterscience Publication, John Wiley and Sons, 1993, and Aquatic Chemistry, W. Stumm and J. J Morgan, Wiley Interscience Publication, John Wiley and Sons, 1991. These references also describe simple precipitation using sulfide anions for the removal of many metal ions. This method requires post-treatment for the removal of sulfide in the effluent, and leads to the formation of toxic $H_2S$ when the pH drops below 8.

Simple precipitation using carbonate anions is also described in these Wiley Interscience publications. Certain metal carbonates (cadmium, lead) can be precipitated at pH values in the range 7.5 to 8.5 as dense filterable sludges (whilst hydroxide precipitation of these elements occurs only at pH 10 or greater and leads to higher sludge volume). However the process is not effective for all metals, including zinc and nickel; iron(III) does not form a carbonate. Precipitation can be carried out using specialty agents such as RHM-1000 (SITE 94, p. 210, Technicon Environmental) or macromolecular complexing agents (SITE 94, p. 224 Atomic Energy of Canada Ltd). The use of these methods to treat vast quantities of acid mine drainage to exacting effluent standards is expensive.

Precipitation using an aqueous slurry of tailings from proximal mining operations has been suggested. This method is particularly appropriate for remediation of the Berkeley Pit site where alkaline tailings are produced at the Weed concentrator adjacent to the pit. The process is described in The Aqueous Geochemistry of the Berkeley Pit, Butte, Mont. USA. A. Davis and D. Ashenberg, Applied Geochemistry, Volume 4, pp 23–36, 1989. The optimal final state pH is believed to be 5, which optimises arsenic insolubility and provides a significant quantity of ferrihydrite (amorphous ferric oxide hydroxide), which in turn will partially bind trace metals in the sludge. Problems associated with the above method include the production of significant sludge volumes and the incomplete removal of some toxic metal contaminants.

Limestone neutralisation and aeration at pH 5–6 followed by a separate lime precipitation step (pH 9–10) followed by polishing with barium oxide/hydroxide for sulfate removal and neutralisation with carbon dioxide. This multi-stage process, which requires the removal of precipitated sludge in 2 or 3 separate operations, has been recommended for the remediation of acid mine drainage at the Berkeley Pit in The Chemical Precipitation Treatment Process for Acid Mine Drainage at the Berkeley Pit. Hsin—Hsiung Huang, Yibin Shi and Haiyang Gu, (Mine drainage Management and Remediation Conference, Fairmont Hot Springs, Opportunity, Mont. July 1992). Huang et al have also provided comparative data for a one-step lime neutralisation process. Features of the multi-step process include:

a) The limestone neutralisation/aeration step (pH 5–6) removes Fe, Al, Cu, and some sulfate. The Fe is removed as Fe(III) hydroxide (ferrihydrite), and whilst this precipitate has better settling characteristics than when lime is used as a precipitating agent, significant processing difficulties related to long settling times and filter clogging would be anticipated to occur.

b) The lime neutralisation step removes cadmium, zinc and manganese from the aqueous phase, and a pH of 10 or greater is necessary to reduce manganese to below 3 ppm. The sludge formed has a large volume and is slimy and difficult to settle and filter. It is unstable with respect to discharge back into the Pit and must be disposed in a controlled area or extracted for metal values.

c) Trace metals such as arsenic, cadmium etc are adsorbed on the surface of the ferrihydrite. This adsorption is charge-driven and if the pH changes to a value below the isoelectric point, adsorbed cationic material may be released back into the environment.

d) The precipitate from the first limestone precipitation phase must be removed before the second lime precipitation reaction occurs, otherwise aluminium is re-solublised. This leads to the necessity of a double filtration step.

e) Copper cannot be readily released from the limestone neutralisation sludge.

f) The removal of sulfate ions by precipitation with barium oxide/hydroxide is expensive and the residual barium species are toxic.

g) The air sparging steps and the pH polishing steps by carbon dioxide sparging are expensive in terms of pumping energy.

Huang et al. noted a number of problems with the neutralisation process including the inability to remove aluminium and manganese at the same time and the instability of the sludge with respect to re-dissolution in the Pit.

The removal of iron from acidic sulfate-containing leach liquors which have been used to process nonferrous metal ores (e.g. zinc, copper) has been achieved using the Jarosite precipitation process. (reference—Jarosites: A Review. GK Das et al. Min. Proc. Ext. Met. Rev., Vol 16, pp185–210 1996). Jarosite precipitates are formed at low pH values and elevated temperatures (60–100° C.) under ambient atmospheric conditions in the presence of appropriate ions, e.g. barium calcium or lead. The formula for the Jarosite family of compounds is $AB_3(XO_4)_2(OH)_n \cdot mH_2O$ where A represents monovalent or divalent metal species (commonly Pb, possibly Ag, $NH_4$, $H_3O$, Na, K) and B represents a trivalent or tetravalent metal species (e.g. Fe(III), Al(III), Sn(IV)). X represents a member of the family consisting of sulphur, phosphorus, silicon, arsenic. The most common Jarosites are based on trivalent iron and have a formula of $M[Fe(OH)_2]_3(SO_4)_2$ where M is the species $H_3O$, Li, Na, K, $NH_4$, Ag and 0.5 Pb.

The Jarosite remediation process is not suitable for the remediation of acid mine drainage because the requirement for high temperatures leads to unacceptably high process costs, and, the requirement for a substantial excess of trivalent over divalent/monovalent metal species in the Jarosite structure is not compatible with the composition of acid mine drainage in many locations, e.g. the deep water of the Berkeley Pit where excess divalent species are present.

SUMMARY OF THE INVENTION

It is an object of this invention to provide a process for the treatment of acid mine drainage which reduces or overcomes one or more shortcoming of the prior treatment methods.

We have made the surprising discovery that if alkaline reagents are added to acid mine drainage until the final pH of the system is in the range 7–9 or greater under conditions such that ferrous ions in the acid mine drainage are stable with respect to oxidation, until the pH is greater than approximately 7.5, a coarse moderately crystalline precipitate can be formed which settles readily and can be filtered without difficulty, leaving a filtrate which is substantially reduced in metal ions.

Accordingly we provide a method of treatment of acid waste waters containing heavy metals including ferrous and ferric ion comprising increasing the pH of the acid waste to at least 7.5 by additions of an alkaline reagent under conditions such that ferrous ions are stable with respect to oxidation to ferric ions (herein referred to as non-oxidising conditions) to form a precipitate and collecting the precipitate.

The method will preferably involve increasing the pH from its starting value to at least 7.5 under the non-oxidising conditions and subsequently increasing the pH to at least 8. We have found that the pH range 6.0 to 7.5 is the most critical to providing formation of a precipitate which may be easily filtered and which binds undesirable species present in the acid mine drainage.

Alkaline reagents which may be added to the acid mine drainage can be chosen from the group consisting of lime, limestone, sodium carbonate, sodium hydroxide, potassium hydroxide, calcined dolomite, magnesia, ammonium hydroxide. These reagents may be insoluble or in finely suspended form, or in the form of finely divided powder.

Conditions in which ferrous ions in the initial waste stream are stable against oxidation to ferric ions may be achieved either by carrying out the precipitation reaction under a non-oxidising atmosphere (e.g. nitrogen, argon, natural gas) or by carrying out the precipitation reaction in a filled, closed reactor vessel such as a pipe.

In one preferred embodiment of this invention, the colour of the precipitate formed in the pH range of pH 6.0–7.5 is green, and said precipitate is highly susceptible to oxidation becoming honey-brown in colour when exposed to oxygen or other oxidizing atmospheres.

The green precipitate formed in the regime pH 6.0–7.5 has been found to belong structurally to the pyroaurite class of compounds, which according to Hansen et al. consist of alternating positively charged trioctahedral metal hydroxide layers and negatively charged interlayers of anions such as chloride, sulphate, carbonate (see Evaluation of Free Energy of Formation of Fe(II)/Fe(III) Hydroxide-Sulfate (green rust) and its Reduction of Nitrate, H. B. Hansen et al. Geochemica Cosmochemica Acta 1994 Vol. 58 No.12 pp2599–2602). The pyroaurite compounds have the general composition

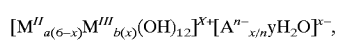

where (0.9<x<4.2) wherein $M^{II}$ and $M^{III}$ are divalent and trivalent metal cations, respectively, $A^{n-}$ is an anion and n has a value dependent on x such that the compound has a neutral charge, and y is the amount of interlayer water which may vary and y is greater than zero. A common pyroaurite type compound which may be formed from acid mine drainage using the process of this invention is Green Rust comprising Fe(II)–Fe(III) hydroxides with interlayer sulfate ions or other anions. Green Rust may be detected by means of X ray diffraction and by means of Mossbauer spectroscopy (see references below). The latter method is useful where the X ray diffraction lines are masked for example by more highly crystalline materials such as gypsum.

A further characteristic of Green Rust and other pyroaurite-like compounds is their ability, if not seriously degraded, to transform by thermal decomposition to a crystalline spinel or ferrite structure.

We have found that when pyroaurite-like compounds are precipitated, the presence of foreign heavy metal cations does not inhibit the rapid formation of reasonably crystalline precipitates. This behaviour contrasts markedly with the case in standard precipitations of hydroxy, carbonate or sulphide salts, where some foreign cations tend to reduce or inhibit crystallisation. Discussions on the structure of green rust have been provided by: (a) Brindley G. W. and Bish D. L. (1976) in Green Rust: A Pyroaurite Structure. Nature Vol 263 p. 353; (b) McGill I. R., McEnaney B. and Smith D. C. (1976). Crystal Structure of Green Rust Formed by Corrosion of Cast Iron. Nature Vol 259 p200–201; and (c) Kuma, K. Paplawsky W. Gedulin B. and Arrhenius G. (1989) Mixed-Valence Hydroxides as Bio-inorganic Host Minerals. Origins of Life Vol 19.

The x-ray diffraction properties of pyroaurite-like hydroxide salts is discussed in a number of references including: (d) Bernal Desgupta and Mackay, The Oxides and Hydroxides of Iron and their Structural Interrelationships, Clay Minerals Bulletin, 1959, 4, 15–30); (e) Bigham, J. K. and Tuovinen, O. H. Mineralogical, morphological and microbiological characteristics of tubercles in cast iron water mains as related to their chemical activities, in Planetary Ecology (ed D. E. Caldwell et al) 1985. Pp239–250 Van Nostrand Reinhold; and (f) Stampfl P. P. Ein basisches Eisen-II—III karbonat. Rost. Corrus. Sci. 1969, Vol 9, 185–187.

Mossbauer spectroscopic properties of pyroaurite-like compounds is discussed in: (g) Koch C. B. and Morup S. Identification of GR in on an ochre sludge. Clay Minerals (1991), 26, 577–582; Hansen, C. B. et al. Abiotic Nitrate Reduction to Ammonium: (h) Key role of Green Rust, Environ Sci. & Technol. 1996, Vol 30, No. 6 pp2053–2056; and (i) Murad, E. And Taylor, R. M. The Oxidation of Hydroxycarbonate Green Rusts in Industrial Applications of the Mossbauer Effect, 1986, Ed. G. J Long and J. G. Stevens, pp 505–593, Plenum, N.Y.

Preferably at least 30% by weight of the precipitate formed in the pH regime 6.0–7.5 will comprise pyroaurite-like compounds.

Acid mine drainage will in general comprise divalent and trivalent metal cations and we have found that the ratio of divalent cations to trivalent cations effects the efficiency with which the desired precipitate is formed. The ratio obtained by taking the sum of the mole quantities of non-calcium divalent species per liter and dividing by the sum of the mole quantity of trivalent species per liter (the D/T ratio) ration is preferably greater than 1. More preferably D/T is between 2 and 100, and even more preferably D/T is between 2 and 20, and even more preferably D/T is between 4 and 10.

During the increase of pH from 6.0 to 7.5 under the method of the invention (which is caused by the addition of alkaline reagents) we have found that there is a significant decline in soluble ferrous ion concentration. Typically the ferrous ion concentration at pH 7.5 will decline to no more than 25% of the concentration at pH 6.0. Preferably the decline at pH 7.5 will be to no more than 10% and more preferably to no more than 2% of the soluble ferrous ion concentration at pH 6.0.

In accordance with a preferred embodiment we provide a process for the remediation of metals from acid waste wherein the acid waste (preferably of pH less than 4) comprises divalent cation species including iron and one or more of cobalt, nickel, copper, magnesium, manganese or zinc and trivalent species including iron and optionally also other trivalent species such as aluminium and wherein the process comprises adding alkaline reagents to the acid waste until the final pH of the system is in the range 7–9 or greater, and wherein the reaction conditions are such that ferrous ions in the acid waste are stable with respect to oxidation, until the pH is greater than approximately 7.5. The process further comprises removing the coarse moderately crystalline precipitate formed as a result of the addition of alkaline reagents under the above conditions, leaving a resultant liquor which contains low levels of dissolved metal species.

Precipitated salts formed according to the process of this invention can readily be filtered without a settling or flocculation stage. The salts exhibit a coarse, often platey structure, at least in part, whereas ferrihydrite arising from the rapid precipitation of Fe(III) with carbonate or hydroxide comprises ultra-fine particles frequently having no obvious morphology under electron microscopy. Furthermore, good remediation of heavy metal components can be achieved at the conclusion of a pH ramp starting at the pH of the acid mine drainage (e.g. pH 3.3 for the Berkeley Pit contaminated water) and ending at a pH value in the range 7.5–9. Provided that appropriate pH modifying reagents are used, precipitates formed at a low pH do not redissolve at a higher pH, so that only one filtration step for sludge removal is required at the termination of the pH ramp. The ability to isolate the precipitate at pH 7.5–9 is a significant advantage over the prior art which in many cases requires a pH of 11 or more.

Remediation of acid mine drainage by the method of this invention does not use air sparging, nor does it require significant carbon dioxide sparging for pH adjustment. Where the acid mine drainage is collected in a large pit or reservoir, stratification may occur, whereby the surface layer (e.g. top 2 m) comprises iron as Fe(III) and the deep layer (below 3 m) comprises iron as Fe(II). In this situation, an appropriate divalent/trivalent ratio may be achieved by judicious mixing of waters of deep and surface origin. The recovery of valuable metals such as zinc and copper from the precipitated pyroaurite-like compound can be achieved by solubilisation using acid and/or ammoniacal or other treatments followed by electro-winning, solvent extraction or resin-based recovery methodology.

In a preferred embodiment, the precipitation reaction of the present invention is carried out in a pipe reactor. A pipe reactor is particularly preferred as it enables a continuous rather than a batch process to be used while excluding oxygen and minimising environmental hazards. By changing the length and diameter of the pipe, various reaction times can be achieved providing good control of the process.

The process of this invention can be a batch process or a continuous process. In another preferred embodiment, the reactor vessel can comprise one or more continuous stirred tank reactors.

The process of the present invention generally allows the undesirable metal values to be substantially removed in a single precipitation process and the precipitate is generally easy to isolate without the use of further chemical additives such as flocculating agents and the like.

The precipitate may be collected by any suitable means. For example a filter, stirred settling pond or lamella thickener may be used to collect the precipitate.

DETAILED DESCRIPTION

The invention will now be demonstrated by the following examples. It will be understood that the invention is not limited to the particular examples provided hereunder.

EXAMPLE 1

Remediation of Metal Cations from Berkeley Pit Acid Mine Drainage (AMD)

Method

AMD taken deep (200 ft) from the Berkeley Pit was bottled in a high density polyethylene (HDPE) container with minimal free air above the liquid. In the laboratory, the HDPE container was opened in a glove box under argon and 200 ml of the Pit water was added to a stoppered 250 ml Metrohm reaction vessel with argon flowing over the fluid surface.

The glass stopper of the vessel contained ground glass conical apertures to take a plastic blade stirrer, a glass pH electrode, a plastic microburette with a non-diffusing tip as well as the argon delivery tube. Ambient temperature was about 21° C. A solution of approximately 1M $Na_2CO_3$ was made with argon saturated double deionised water. The sodium carbonate solution was supplied to the burette system of an automatic titrimeter set to a pH stat mode so that on any hydrolysis sufficient alkali would be automatically added to restore the pH upwards to a preset value.

As the set pH was slowly raised to values above that of the original system—the automatic burette added small increments of the alkali to increase the solution pH accordingly. At about pH 4.6 there was a whitish yellow cloudy precipitate. As the set pH was raised to 7.5 the solution/suspension underwent a series of colour changes. Argon was flowing above the liquid surface and the solution/suspension was continually stirred. At pH 5.7 the precipitate became darker and at pH 6.7 it was a dark green. A pH of 7.5 was chosen for the maintenance of the precipitation reaction. The reaction was allowed to run until there was no further alkali requirement to maintain the preset value of 7.5 i.e. about 180 minutes.

The set pH was then raised to 8.5 and a further reaction started while the pH was maintained at this value. The suspension remained dark green. All reaction had ceased after 30 minutes. The reaction vessel which was water jacketed was then heated to about 30° C., the argon flow turned low and air allowed to diffuse into the vessel to allow some oxidation of the products. The pH was again raised to a value of 9 and a long, slow, reaction commenced and lasted about 180 minutes. At the end of this time the colour had changed to a pale orange colour with a brown tinge. The suspended solid phase was iron rich and some oxidation had obviously occurred. The suspension was immediately filtered through a Whatman 41 paper (a fast filtering coarse grade) without the provision of any settling period, and the filtrate was examined by inductively coupled plasma (ICP) spectroscopy for elemental composition. The precipitate was washed and dried using acetone and examined by X-ray diffraction and fluorescent X-ray spectroscopy.

Results

The metal composition of the filtrate by ICP is shown in the Table below, together with the starting values of metals in the acid mine drainage (AMD).

| Metal | Before Remediation (ppm) | After Remediation (ppm) |
| --- | --- | --- |
| cadmium | 1.6 | <0.04 |
| cobalt | 1.8 | <0.04 |
| copper | 190 | 0.05 |
| iron | 1088 | <0.05 |
| magnesium | 418 | 37.1 |
| manganese | 182 | 0.2 |
| nickel | 1.0 | <0.04 |
| lead | 0.08 | <0.04 |
| zinc | 552 | <0.04 |

Clearly a significant reduction in metal contents was achieved using the precipitation process of this invention.

X-ray diffraction results on the precipitate showed d spacings at 7.57, 2.57 and 3.77 angstroms. These spacings were compared to the d spacings of takovite, a stable member of the pyroaurite group with basal spacings near to that of green rust (Bernal Desgupta and Mackay, The Oxides and Hydroxides of Iron and their Structural Interrelationships, Clay Minerals Bulletin 1959, 4, 15–30). For takovite (nickel aluminium hydroxy carbonate) the principal spacings are at 7.54, 2.55 and 3.77 angstroms. The close match between the above sets of spacings suggests the presence of a pyroaurite-like double or mixed cation sulfate salt in the precipitate. On the basis of the elemental composition of the acid mine drainage and of the green colour of the precipitate formed during the pH range 6.5–7.5, and of the ease of oxidation to a yellow colour when air was allowed to enter the system, this precipitated pyroaurite-like double or mixed cation hydroxy salt was identified as green rust.

EXAMPLE 2

The purpose of this example is to illustrate the process of this invention when the pH-modifying agents (limestone and lime) are added in the powder form.

Sample: 400 ml fresh pit water collected 6 days before the experiment, sub-sampled and stored in a 500 ml autoclave bottle, completely filled and stoppered.

Reagent preparation: pH modifying agents were powdered one micron $CaCO_3$ and AR grade $CaO$.

Procedure: The 400 ml of pit water was added to a Metrohm reaction vessel and a calibrated pH probe inserted. A small flow of natural gas was used to provide a non-oxidizing atmosphere. The resultant changes in pH and color resulting from additions of powdered limestone and lime are noted in the table below.

| Time | grams of $CaCO_3$ added | Cumulative $CaCO_3$ addition (grams) | pH Observed trend | Color |
| --- | --- | --- | --- | --- |
| 09.30 | | | 2.88 | clear solution |
| 09.30 | 2.0 | 2.0 | 3.7 → slowly | pale lemon suspension |
| 09.32 | | 2.0 | 4.00→ | |
| 09.33 | | 2.0 | 4.83→ | pale yellow ppte |
| 09.45 | | 2.0 | 5.21→ | |

-continued

| Time | grams of CaO added | Cumulative CaO addition (grams) | pH | Observed trend | Color |
|---|---|---|---|---|---|
| 09.45 | 1.0 | 1.0 | 5.55 | | greenish tinge |
| 09.48 | | 1.0 | 5.64 | | yellow-olive colour |
| 09.54 | | 1.0 | 5.88 | | |
| 09.55–10.00 | 1.0 | 2.0 | | | yellow/olive green |
| 10.03 | | 2.0 | 6.93→ | | becoming greener |
| 10.04 | | 2.0 | 7.06→ | | |
| 10.06 | | 2.0 | 7.10→ | | olive green |
| 10.10 | | 2.0 | 7.18→ | | getting darker |
| 10.13 | | 2.0 | 7.57→ | | |
| 10.17 | | 2.0 | 8.09→ | | |
| 10.30 | | 2.0 | 9.28← | | gas off air in getting brown tinge |
| 10.38 | | 2.0 | 9.14← | | |
| 10.46 | | 2.0 | 9.03 | | |
| 10.50 | Terminated | 2.0 | 9.00 | | |

NB arrows going from left to right indicate an upward drift of pH, and vice versa for arrows going from right to left.

The dark green brown suspension was filtered and the filtrate and washings were made up to a fixed volume (564 ml) from which 250 ml were taken and bottled for ICP analysis. This was stored in the refrigerator and was re-filtered through a 0.45 μm filter for analysis.

The results were as follows:

| Species | Al ppm | Mn ppm | Fe ppm | Zn ppm | Cu ppm | Cd ppm | SO$_4$ ppm | pH |
|---|---|---|---|---|---|---|---|---|
| Before treatment | 288 | 209 | 1070 | 572 | 189 | 1.96 | 10600 | 2.9 |
| After treatment | 1.80 | 1.02 | *BDL | 0.002 | *BDL | 0.008 | 1802 | 9.0 |

*BDL = below detectable limit

EXAMPLE 3

The purpose of this example is to illustrate the process of this invention when the sole pH-modifying agent (lime) is added as a suspension.

Material used: Fresh pit water from the Berkeley Pit (200 ft=61 meters sampling depth) was collected on the morning of the experiment in 3 liter glass containers which were filled completely, stoppered and covered with parafilm.

Reagent preparation: pH modifying agent is 0.731M CaO suspension (3.2 g dispersed in 80 ml distilled water). CaO was finely milled reagent grade.

Material preparation: 400 ml of the freshly gathered pit water. The residual pit water in the glass bottle was also bubbled with the natural gas for about 10 sec before being closed in an effort to minimise oxidation.

Procedure: The 400 ml of pit water was added to a Metrohm reaction vessel and a calibrated pH probe inserted. A small flow of natural gas as a non-oxidising atmosphere was passed into the vessel above the liquid surface. The prepared CaO was constantly maintained in suspension using a magnetic stirrer. Samples of the suspension were taken using a dispensing pipette and added to the solution at noted times. The resultant changes in pH and colour resulting from these additions are noted in the table below.

| TIME | ml of CaO suspension added | Cumulative addition (ml) | pH Observed trend | Colour |
|---|---|---|---|---|
| 11.30 | | | 3.03 | clear solution |
| 11.30 | 5 | 5 | 3.81 | |
| 11.35 | 8 | 13 | 4.59 | pale lime green |
| 11.38 | 8 | 21 | 5.13→ | slightly darker |
| 11.40 | 8 | 29 | 5.87 → 5.96 | dark olive green |
| 11.42 | 1 | 30 | 6.04 → 6.05 | |
| 11.43 | 1 | 31 | 6.12 → 6.16 | |
| 11.44 | 5 | 36 | 6.59 | going darker |
| 11.47 | 6 | 42 | 7.52 → 7.60← 7.51 → 7.70 | |
| 11.58 | 5 | 47 | 9.53← | |
| 12.07 | | 47 | 9.05 | a brown tinge |
| 12.21 | | 47 | 8.99 | lighter brown/green |
| 13.17 | | 47 | 8.82 | going y/brown |
| 13.20 | | 47 | 8.81 | |
| 13.30 | TERMINATED | 47 | 8.79 | |

NB Arrows going from left to right indicate an upwards drift of pH, and vice versa for arrows going from right to left.

The dark green brown suspension was filtered and the filtrate and washings diluted to 559 ml. 250 ml was taken and bottled for ICP analysis.

The results were as follows:

| Species | Al ppm | Mn ppm | Fe ppm | Zn ppm | Cu ppm | Cd ppm | SO$_4$ ppm | pH |
|---|---|---|---|---|---|---|---|---|
| Before treatment | 288 | 209 | 1070 | 572 | 189 | 1.96 | 10600 | 2.9 |
| After treatment | 0.14 | 3.3 | BDL | 0.03 | 0.03 | 0.003 | 2309 | 8.8 |

EXAMPLE 4

The purpose of this example is to illustrate the process of this invention when a shorter reaction time was used. The pH-modifying agents (lime, limestone) were added as a suspension.

Sample: The sample consisted of 400 ml pit water collected 13 days before the experiment and stored in a 500 ml glass autoclave bottle which was completely filled and stoppered.

Reagent Preparation: pH modifying agents were 0.1 g/ml one micron CaCO$_3$ suspension and 0.1 g/ml CaO suspension (3.0 g dispersed in 30 ml distilled water in each case). The CaO was taken from the lower part of the bottle to minimize the risk of having CaO that might have been partially converted to the carbonate.

Procedure: The 400 ml of pit water was added to a Metrohm reaction vessel and a calibrated pH probe inserted. A small flow of nitrogen as an inert atmosphere was passed into the vessel above the liquid surface. The resultant changes in pH and colour resulting from there additions are shown below.

| TIME | ml of CaCO$_3$ suspension added | Cumulative CaCO$_3$ addition (ml) | pH Observed trend | Colour |
|---|---|---|---|---|
| 10.43 | | | 2.91 | clear solution |
| 10.43 | 20 ml added in 5 ml lots | 20 | 4.41→→ | pale lemon |
| 10.47 | | 20 | 5.30 | pale lemon ppte |
| | ml of CaO suspension added | Cumulative CaO addition (ml) | | |
| 10.47 | 10.0 | 10.0 | 6.26→ | yellow olive green |
| 10.52 | N$_2$ off air in | 10.0 | 9.43← | olive green |
| 11.04 | | 10.0 | 8.95← | brownish tinge |
| 11.13 | | 10.0 | 8.76← | |
| 11.17 | TERMINATED | 10.0 | 8.73 | |

The dark green brown suspension was filtered through a Whatman type 41 paper using a Buchner funnel. The filtrate and washings were made up to volume in a 500 ml volumetric flask. 250 ml was taken and bottled for ICP analysis. This was stored in the refrigerator and re-filtered through a 0.45 micron filter for analysis. The results were as follows:

| Species | Al ppm | Mn ppm | Fe ppm | Zn ppm | Cu ppm | Cd ppm | SO$_4$ ppm | pH |
|---|---|---|---|---|---|---|---|---|
| Before treatment | 288 | 209 | 1070 | 572 | 189 | 1.96 | 10600 | 2.9 |
| After treatment | 1.0 | 4.1 | BDL | BDL | BDL | BDL | 2600 | 8.7 | finally, it is to be understood that various other modifications and/or alterations may be made without departing from the spirit of the present invention as outlined herein.

What is claimed is:

1. A method of treatment of acid waste waters or acid drainage waters containing metals comprising ferrous and ferric ions, the method comprising increasing the pH of the waters to at least 7.5 by addition of an alkaline reagent under conditions such that ferrous ions are stable with respect to oxidation to ferric ions and a ratio of the number of moles of divalent ions other than calcium to the number of trivalent ions (D/T) is in the range of from 2 to 20, to form a precipitate in the pH range of 6.0 to 7.5 comprising compounds having a pyroaurite structure and collecting the precipitate.

2. A method according to claim 1, wherein the pH is increased from no greater than 6.0 to at least 7.5 under said conditions and wherein the pH is further increased to at least 8 prior to collecting the precipitate.

3. A method according to claim 1 or claim 2, wherein the alkaline reagent is selected from the group consisting of lime, limestone, sodium carbonate, sodium hydroxide, potassium hydroxide, calcined dolomite, magnesia and ammonium hydroxide, and wherein the alkaline reagent is added in the form of solutions, suspensions or finely divided powders.

4. A method according to any one of claims 1 to 2, wherein the waters are continuously passed through a pipe in a turbulent stream and the alkaline reagent is introduced at one or more locations along the pipe.

5. A method according to claim 1, comprising adding the alkaline reagent to the waters in a vessel, wherein the vessel is closed to the atmosphere and is filled with the waters.

6. A method according to claim 5, wherein the vessel comprises a pipe.

7. A method according to claim 6, wherein the flow of waters inside the pipe vessel is turbulent.

8. A method according to claim 5, wherein the vessel comprises one or more continuous stirred tank reactors.

9. A method according to claim 1, wherein the precipitate is formed in the pH range of from 6.0 to 7.5 and is green in colour.

10. A method according to claim 9, further characterised in that the colour of the precipitate formed changes from green to honey-yellow when the precipitate is exposed to the air or to other oxidising conditions.

11. A method according to claim 1, wherein the precipitate comprises a compound of the formula $\{M^{II}_{a(6-x)}M^{III}_{b(x)}(OH)_{12}\}^{x+}\{A^{n-}_{x/n} y H_2O\}^{x-}$ wherein $M^{II}_a$ and $M^{III}_b$ are divalent and trivalent cations respectively and $0.9 < x < 4.2$, $A^{n-}$ is an anion and n has a value dependent on x such that the compound has a neutral charge and y is the amount of interlayer water and y is greater than 0.

12. A method according to claim 11, wherein the precipitate formed comprises green rust or a substituted green rust in which aluminium partly replaces the ferric cation.

13. A method according to claim 1, wherein the concentration of soluble ferrous ions in the waters at pH 7.5 is no more than 25% of its concentration at pH 6.

14. A method according to claim 13, wherein the concentration of soluble ferrous ions at pH 7.5 is no more than 10% of its concentration at pH 6.

15. A method according to claim 1, wherein D/T is in the range from 4 to 10.

* * * * *